United States Patent [19]

Kamiya

[11] 4,133,066
[45] Jan. 9, 1979

[54] METHOD FOR MANUFACTURING SELF-LOCKING SPRING NUT

[76] Inventor: Minoru Kamiya, 2-46-3, Minami-Otsuka, Toshima, Tokyo, Japan

[21] Appl. No.: 803,531

[22] Filed: Jun. 6, 1977

[51] Int. Cl.$^2$ ............................................. B21D 53/24
[52] U.S. Cl. .................................................. 10/86 A
[58] Field of Search ............................ 10/86 R, 86 A; 85/32 CS; 151/14 CS, 21 R, 21 A

[56] References Cited

U.S. PATENT DOCUMENTS

| | | | |
|---|---|---|---|
| 1,913,685 | 6/1933 | Schalk | 10/86 A |
| 2,306,806 | 12/1942 | Hoopes | 151/21 R |
| 3,459,248 | 8/1969 | Waller | 151/14 CS |
| 3,461,935 | 8/1969 | Monticelli | 151/21 R |
| 3,515,027 | 6/1970 | Textrom | 85/32 CS |

FOREIGN PATENT DOCUMENTS

| | | | |
|---|---|---|---|
| 1298073 | 6/1969 | Fed. Rep. of Germany | 10/86 R |
| 45-36691 | 11/1970 | Japan. | |
| 50-12461 | 2/1975 | Japan. | |

Primary Examiner—E. M. Combs
Attorney, Agent, or Firm—Graybeal, Barnard & Uhlir

[57] ABSTRACT

A method for manufacturing a self-locking spring nut is disclosed herein. In this method, a spring nut is tapped in its stretched or compressed condition, where a lead or pitch of the spring nut of a helical form is increased or decreased, say 0.5 to 6%. Accordingly, when a bolt is inserted into the spring nut thus prepared, then threads on the bolt undergo a compressive or tensile stress by the spring nut.

As a result, the spring nut may be locked on a bolt in any position. This method utilizes an elasticity of the spring nut to be locked on the bolt, rather than interference between the female and the male threads on the nut and bolt, respectively, for instance, interference caused by deforming the configuration of threads or changing a pitch of a male thread relative to that of a female thread. Accordingly, the self-locking nut of the invention may be repeatedly used, without being damaged. The pitch of the spring nut of a helical form, however, should differ from the pitch of a tapped or female thread provided in the inner surface of the spring nut.

15 Claims, 7 Drawing Figures

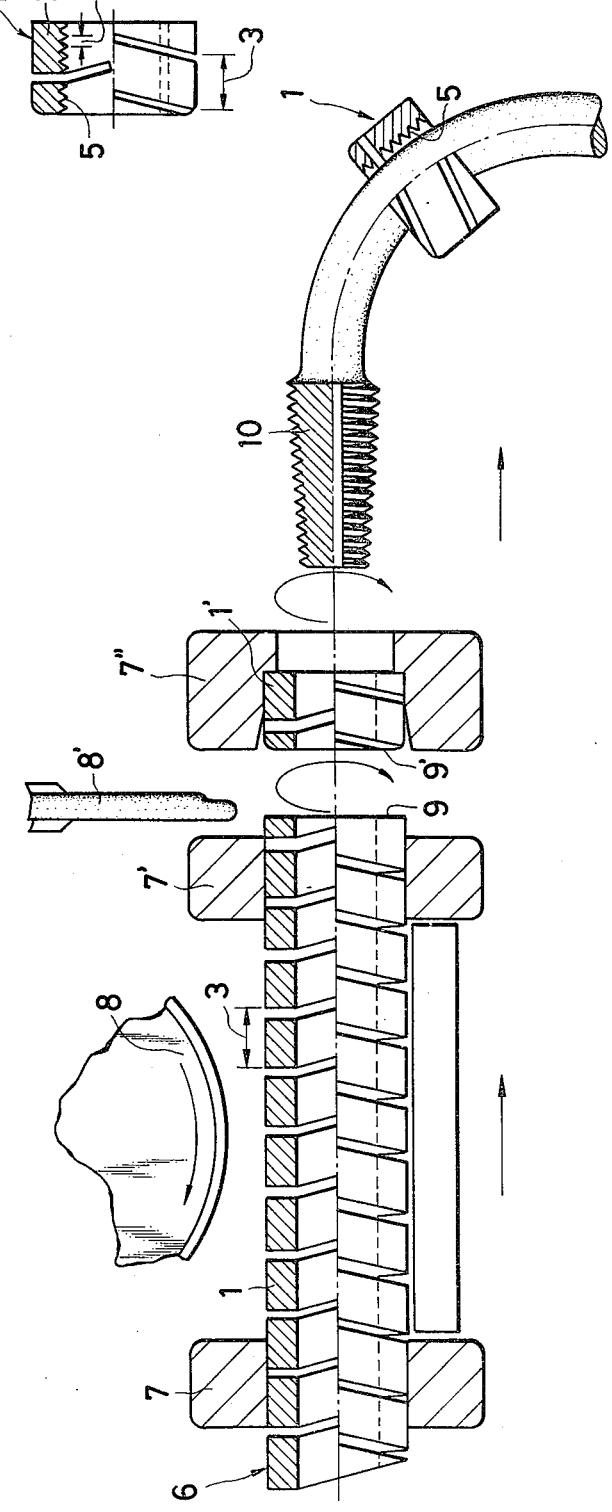

METHOD FOR MANUFACTURING SELF-LOCKING SPRING NUT

BACKGROUND OF THE INVENTION

1. Field of the Invention

This invention relates to a method for manufacturing a self-locking spring nut, and more particularly to a self-locking spring nut which may be locked on a bolt elastically.

2. Description of the prior art

In a combination of a female thread and a male thread, such as for instance, those of a nut and a bolt, there should be provided a clearance between the male thread and the female thread, even in the case of a close-tolerance bolt and nut, for insuring smooth threading of the former into the latter. It follows from this that when tightening a nut on a bolt, the aforesaid clearance reduces a frictional force created between a female thread and a male thread, thus leading, more or less, to a loose joint.

Many attempts have been proposed to prevent such a loose joint by providing a lock nut or self-locking nut. These nuts may be classified into two types, i.e., single nut type and a double nut type.

Included by a single nut type are: (1) a nut which is deformed by a press machine; (2) a nut having an elliptic collar; (3) a nut, one end of which is to be deformed due to a tightening force; (4) a nut having a tongue for use in locking; (5) a nut having a resilient material such as nyron interposed between the bolt and the nut; (6) a nut which is used in combination with a washer. However, these attempts have suffered from disadvantages in that a tightening force varies as the time goes on, and there results a loose joint particularly in the presence of repeated vibrations. If the case comes to the worst, the threads are worn or damaged, and hence these nuts can no longer used again.

SUMMARY OF THE INVENTION

It is accordingly an object of the present invention to provide a method for manufacturing a self-locking spring nut, which provides a consistent tightening force, and is not loosened even in the application which is attended with vibrations.

It is a further object of the present invention to provide a method for manufacturing a self-locking spring nut, which may be used repeatedly, because of freedom of damages and wear on threads thereof.

According to the present invention, there is provided a method for manufacturing a self-locking spring nut, which includes the steps of cutting a continuous run of helical spring-material into a piece of a nut size; rigidly holding the piece thus cut in a chuck, with its one end freed, and the other clamped therein; inserting a tap into a hole provided in the piece from the aforesaid other end of the piece so as to tap the nut in a stretched condition, the pitch of threads of the tap being different from the pitch of threads of the aforesaid helical spring material.

According to another aspect of the present invention, the tap may be inserted into the piece from its free end so as to tap the piece in a compressed condition.

According to a still another aspect of the invention, the piece may be held either in a compressed or stretched condition, before hand.

According to a yet another aspect of the present invention, a tangent of a thread inclination of the aforesaid continuous run of helical spring material may be positive or negative.

BRIEF DESCRIPTION OF THE DRAWINGS

FIG. 1 is a longitudinal cross-sectional view of a spring nut according to the present invention;

FIG. 2 is a longitudinal cross-sectional view of a continuous run of a helical spring material which is being cut into a piece of a nut size and then a tap is being inserted therein;

FIGS. 3(a), (b), (c), (d) are front views showing various shapes of nuts; and

FIG. 4 is a longitudinal cross-sectional view of a nut which is one of modifications of the spring nuts according to the present invention.

DESCRIPTION OF THE PREFERRED EMBODIMENTS

Referring now to FIG. 1, there is shown at 6 a continuous run of helical spring material. The spring material 6 is made by winding a wire of a given cross sectional configuration into a helical form at a given lead or pitch 3. The continuous run of a helical spring material 6 is held by chucks 7, 7' and then rotated. The outer surface of the spring material 6 is knurled or slotted by means of a milling cutter 8 for finishing the outer contour of the spring material into a desired shape.

Then, the spring material 6 is moved to the right and held by chucks 7', 7" in two positions, and then cut into a piece of a desired length by means of a milling cutter 8', whereupon the opposite end faces 9, 9' of the piece are finished into desired shapes. Then, the piece 1' (This will be referred to as a nut piece, hereinafter.) is held by a chuck 7" and rotated. Then, the nut piece 1' is brought towards a bend shank tap 10 so as to have the tap 10 inserted therethrough. Thus, a female thread is defined in the inner surface of the nut piece 1'. The nut piece 1' is removed through a shank portion 11 of the bend shank tap 10. In this manner, spring nuts according to the present invention may be manufactured continuously.

As best shown in FIG. 2, the nut piece 1' is held by the chuck 7", with its one end freed, and the other clamped. In case the bend shank tap 10 is relatively inserted into the nut piece 1' from its clamped end side, then the nut piece is tapped in its stretched condition. Conversely, in case the tap 10 is inserted into the nut piece 1' from its free end side, then the nut piece 1' is tapped in its compressed condition. In this respect, the pitch or lead 4 of the tap 10 i.e., the pitch of female threads 5 defined in the inner surface of the nut piece 1' should be different from the pitch or lead 3 of the helical spring material 6.

It should be noted however that the nut piece may be stretched or compressed beforehand by suitable tools, and then the tap 10 may be relatively inserted therein.

The pitch or lead of the spring nut thus manufactured is increased or compressed 0.5 to 6%, as compared with those of the spring nut which is being tapped. It is needless to mention, that, after tapping, the nut piece 1' compressed or stretched during tapping is restored to its original configuration. When the spring nut is tightened on a bolt, the lead 3 of the spring nut is decreased or increased, so that a compressive or tensile force acts on the male threads on the bolt by the female threads provided in the inner surface of the nut piece 1'. The lead 4 of the female threads 5 is different from the lead of the helical spring material 6. Meanwhile, when the bend shank tap 10 is inserted into the nut piece 1', the nut piece tends to be spread radially outwardly, and hence the chuck 7" is used to limit such an enlargement of the nut piece 1'. However, if the chuck 7" allows a certain amount of radial enlargement of the nut piece, then the bolt may be resiliently squeezed by the nut from radially outwardly, thus increasing an additional frictional force.

FIG. 3 shows various cinfigurations of the spring nuts made according to the present invention. FIG. (a) represents a knurled outer surface 12 of the nut, (b) represents slots 13 defined in the outer surface of the nut, (c) represents a hexagonal outer contour of the nut, and (c) represents an octagonal outer contour of the nut piece.

The cross sectional shapes of the nuts may vary according to their applications. FIG. 4 shows a nut having a flange portion 14.

It should be noted that, in any case, the inner surface of the nut piece is provided with female threads 5, and that the inner surface of the helical spring material 6 is not used in place of female threads such as a helisert.

As is apparent from the foregoing description, the spring nut according to the present invention finds best application where vibrations arise, thus precluding a risk of a loose joint. In addition, the spring nut according to the present invention dispenses with the use of a washer of any kind and is well adapted to a mass production, as has been described with reference to FIG. 2.

Although the present invention has been described with respect to specific details of certain embodiments of the invention, it is not intended that details be limitations upon the scope of the invention except insofar as set forth in the following claims.

I claim:

1. A method of manufacturing a self-locking spring nut, comprising the steps of:
    providing a piece of a helical spring material of a single nut size;
    holding said piece, with at least a portion of the piece being free;
    rotating said piece;
    inserting a tap into the axial hole defined by said piece so as to tap said piece to form a female screw thread in the wall of said hole by utilizing the thrust of said tap.

2. A method of manufacturing a self-locking spring nut, as defined in claim 1, comprising rigidly clamping one end of said piece, and maintaining the other end thereof free.

3. A method of manufacturing a self-locking spring nut, as defined in claim 1, comprising rigidly clamping one end of said piece, and maintaining the other end thereof free, and inserting said tap into the axial hole from said end which is rigidly clamped.

4. A method of manufacturing a self-locking spring nut, as defined in claim 1, comprising rigidly clamping one end of said piece and maintaining the other end thereof free, and inserting said tap into the axial hole from said end which is maintained free.

5. A method for manufacturing a self-locking spring nut, as defined in claim 1, wherein a plurality of pieces are obtained by severing segments from a continuous run of helical spring material.

6. A method for manufacturing a self-locking spring nut, as defined in claim 1, further comprising the step of permitting radial enlargement of at least some portions of said piece during the tapping operation.

7. A method of manufacturing a self-locking spring nut, as defined in claim 2, further comprising the step of permitting radial enlargement of at least some portions of said piece during the tapping operation.

8. A method for manufacturing a self-locking spring nut, as defined in claim 3, further comprising the step of permitting radial enlargement of at least some portions of said piece during the tapping operation.

9. A method of manufacturing a self-locking spring nut, as defined in claim 4, further comprising the step of permitting radial enlargement of at least some portions of said piece during the tapping operation.

10. A method for manufacturing a self-locking spring nut, as defined in claim 5, further comprising the step of permitting radial enlargement of at least some portions of said piece during the tapping operation.

11. A method of manufacturing a self-locking spring nut, comprising the steps of:
    providing a piece of a helical spring material of a single nut size;
    holding a portion of said piece while leaving another portion of the piece free;
    inserting a tap into the axial hole defined by said piece and relatively rotating said piece so as to tap said piece to form a female screw thread in the wall of said hole in both said portions of said piece by utilizing the thrust of said tap.

12. A method for manufacturing a self-locking spring nut, comprising the steps of:
    holding a piece of a helical spring material of a single nut size with at least a portion thereof free in the axial direction; and
    inserting a tap from one end of said material in the axial direction thereof, and progressively stretching said portion under the thrust of said tap while a female thread is formed in the inner peripheral surface of said portion, whereby the pitch of the female thread formed in said portion is continuously varied in the axial direction.

13. The method as defined in claim 12, wherein said portion is maintained free in the radial direction, as well.

14. A method for manufacturing a self-locking spring nut, comprising the steps of:
    holding a piece of a helical spring material of a single nut size with at least a portion thereof free in the axial direction; and
    inserting a tap from one end of said material in the axial direction thereof, and progressively compressing said portion under the thrust of said tap while a female thread is formed in the inner peripheral surface of said portion, whereby the pitch of the female thread formed in said portion is continuously varied in the axial direction.

15. A method as defined in claim 14, wherein said portion is maintained free in the radial direction, as well.

* * * * *